(12) United States Patent
Okada

(10) Patent No.: US 6,994,313 B2
(45) Date of Patent: Feb. 7, 2006

(54) PRESSURE CONTROL VALVE

(75) Inventor: Satoru Okada, Gifu-ken (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 0 days.

(21) Appl. No.: 10/959,538

(22) Filed: Oct. 6, 2004

(65) Prior Publication Data

US 2005/0077493 A1   Apr. 14, 2005

(30) Foreign Application Priority Data

Oct. 8, 2003   (JP) .............................. 2003-349036

(51) Int. Cl.
*F16K 31/02* (2006.01)

(52) U.S. Cl. .................... 251/129.19; 251/129.08; 251/337

(58) Field of Classification Search .......... 251/129.15, 251/129.19, 129.08, 129.2, 337
See application file for complete search history.

(56) References Cited

U.S. PATENT DOCUMENTS

| | | | | |
|---|---|---|---|---|
| 5,615,860 A | * | 4/1997 | Brehm et al. | 251/129.07 |
| 5,868,167 A | * | 2/1999 | Miki et al. | 251/129.16 |
| 6,527,249 B2 | * | 3/2003 | Niimi et al. | 251/129.15 |
| 6,607,176 B1 | * | 8/2003 | Mayr et al. | 251/129.08 |
| 6,619,615 B1 | * | 9/2003 | Mayr et al. | 251/129.08 |

FOREIGN PATENT DOCUMENTS

| | | |
|---|---|---|
| JP | 06-299958 | 10/1994 |
| JP | 07-43543 | 10/1995 |
| JP | 2001-153256 | 6/2001 |
| JP | 2001-311477 | 11/2001 |

\* cited by examiner

*Primary Examiner*—John Bastianelli
(74) *Attorney, Agent, or Firm*—Akin Gump Strauss Hauer & Feld, LLP

(57) ABSTRACT

A pressure control valve includes a shaft hole formed through a wall surrounding a pressure detecting chamber of a body, the shaft hole being provided with a valve port, a communication shaft inserted through the shaft hole and having an end protruding from the valve port and provided with a valve element, a biasing unit, a branch hole, a sealing member, a pressure sensing cylindrical member, a diaphragm mounted on the open end of the pressure sensing cylindrical member, a terminal wall formed on the body so as to be opposed to the diaphragm, and a stretching member stretched between the diaphragm and the terminal wall, the stretching member being subjected to a spring force the diaphragm receives when the fluid pressure is in the pressure detecting chamber is lower than the predetermined reference pressure, thereby moving the valve element to the opening side.

28 Claims, 14 Drawing Sheets

Ps-i

PRESSURE CONTROL VALVE

BACKGROUND OF THE INVENTION

1. Field of the Invention

This invention relates to a pressure control valve including a valve element opening and closing a valve port according to pressure of a fluid.

2. Description of the Related Art

JP-A-2001-153256 discloses one of the above-described type pressure control valves. The disclosed pressure control valve comprises bellows expanded and contracted according to fluid pressure. The expansion and contraction of the bellows move a valve element, which opens and closes a valve port.

However, the bellows are expensive parts and accordingly, development of a pressure control valve with a less expensive pressure sensing members instead of the bellows has been desired.

SUMMARY OF THE INVENTION

Therefore, an object of the present invention is to provide a pressure control valve with a less expensive pressure sensing member than the bellows.

The present invention provides a pressure control valve including a body to which a valve element is assembled so as to be movable and which is provided with a pressure detecting chamber, wherein the valve element opens a valve port when pressure of a fluid provided in the pressure detecting chamber is lower than a predetermined reference pressure, and the valve element closes the valve port when the fluid pressure in the pressure detecting chamber is higher than the predetermined reference pressure. The pressure control valve comprises a shaft hole formed through a wall surrounding the pressure detecting chamber of the body, the shaft hole being provided with the valve port located at a side away from the pressure detecting chamber, a communication shaft inserted through the shaft hole and having an end protruding from the valve port and provided with the valve element, biasing means for biasing the valve element so that the valve element is pressed against an opening edge of the valve port thereby to close the valve port, a branch hole branched from a middle portion of the shaft hole and communicating with the valve port, a sealing member sealing a gap between the communication shaft and an inner wall of the shaft hole, said inner wall being located nearer to the pressure detecting chamber than the branch hole, a pressure sensing cylindrical member having a closed end fixed to the communication shaft in the pressure detecting chamber and an open end directed opposite the valve element, a diaphragm provided on the open end of the pressure sensing cylindrical member, a terminal wall provided on the body so as to be opposed to the diaphragm, and a stretching member stretched between the diaphragm and the terminal wall, the stretching member being subjected to a spring force the diaphragm receives when the fluid pressure is in the pressure detecting chamber is lower than the predetermined reference pressure, thereby moving the valve element to the opening side.

In the foregoing valve, the diaphragm is provided in the pressure detecting chamber. The stretching member is stretched between the diaphragm and the terminal wall provided on the body. The diaphragm is subjected to the fluid pressure in the pressure thereby to be elastically deformed. As the fluid pressure is decreased in the pressure detecting chamber, the diaphragm is restored to its formal state so as to come nearer to the terminal wall side and a counterforce received from the stretching member is also increased. When the fluid pressure in the pressure detecting chamber becomes lower than the predetermined reference pressure, the counterforce the stretching member receives from the diaphragm moves the valve element to the open side, whereupon the valve port is opened. Thus, the invention can provide the pressure control valve with the diaphragm which is less expensive than the bellows Furthermore, the distance between the terminal wall and the diaphragm is changed by the adjusting means even when the assembly results in differences in the distance between the terminal wall and the diaphragm in the closed state of the valve element. As a result, the elastic force of the diaphragm for the stretching member can be adjusted. Consequently, the differences can be reduced in the relationship between the fluid pressure in the pressure detecting chamber and the opening and closure of the valve element.

Still further more, the distance between the terminal wall and the diaphragm can be adjusted by changing a depth of threading engagement between the thread portions of the valve element or pressure sensing cylindrical member and the communication shaft. Alternatively, the distance can be adjusted by changing a depth of threading engagement between the thread portions of the first and second communication shafts. Yet alternatively, the distance can be adjusted by changing a depth of force fitting of the fitting portion provided in the divided portion of the body.

Yet still furthermore, the inner edge of the packing plate is pressed by the pressing protrusion into the funneled shape. The funneled portion of the packing plate is spread by the communication shaft thereby to adhere to the outer circumferential face of the communication shaft. As a result, a sealed space is defined between the branch hole and the pressure detecting chamber. Further, when the pressure in the branch hole is applied to the packing plate, the diameter of the funneled portion of the packing plate is reduced such that the funneled portion is pressed against the communication shaft, whereupon the air tightness is increased. Consequently, the fluid can reliably be prevented from flowing from the branch hole into the pressure detecting chamber.

Yet still furthermore, the stretching member is positioned at the center of the circular rib of the diaphragm by the centering protrusion and the centering depression, and accordingly, the stretching member applies an axial force to the center of the circular rib. As a result, the circular rib is deformed uniformly over its circumference and accordingly, the elastic force of the diaphragm can be stabilized. Consequently, the valve element can stably be carried out the closing and opening of the valve port. Further, the concentration of stress can be prevented since the outer face of the centering protrusion and/or the inner face of the centering depression is substantially semi-spherical. Yet further, the diaphragm can be reinforced by the inner adhering disc and/or the outer adhering disc which are adherent to diaphragm.

Yet still furthermore, a shaft-like component comprising the pressure sensing cylindrical member, communication shaft and plunger has both ends guided by the distal and proximal guide portions in the direction of movement of the valve respectively. Accordingly, an inclination of the shaft-like component is limited, whereupon the movement of the valve can be rendered stable while the sliding resistance is restrained. Consequently, the valve element can open and close the valve port stably.

BRIEF DESCRIPTION OF THE DRAWINGS

Other objects, features and advantages of the present invention will become clear upon reviewing the following description of the embodiments with reference to the accompanying drawings, in which.

DETAILED DESCRIPTION OF THE INVENTION

Figure 1:
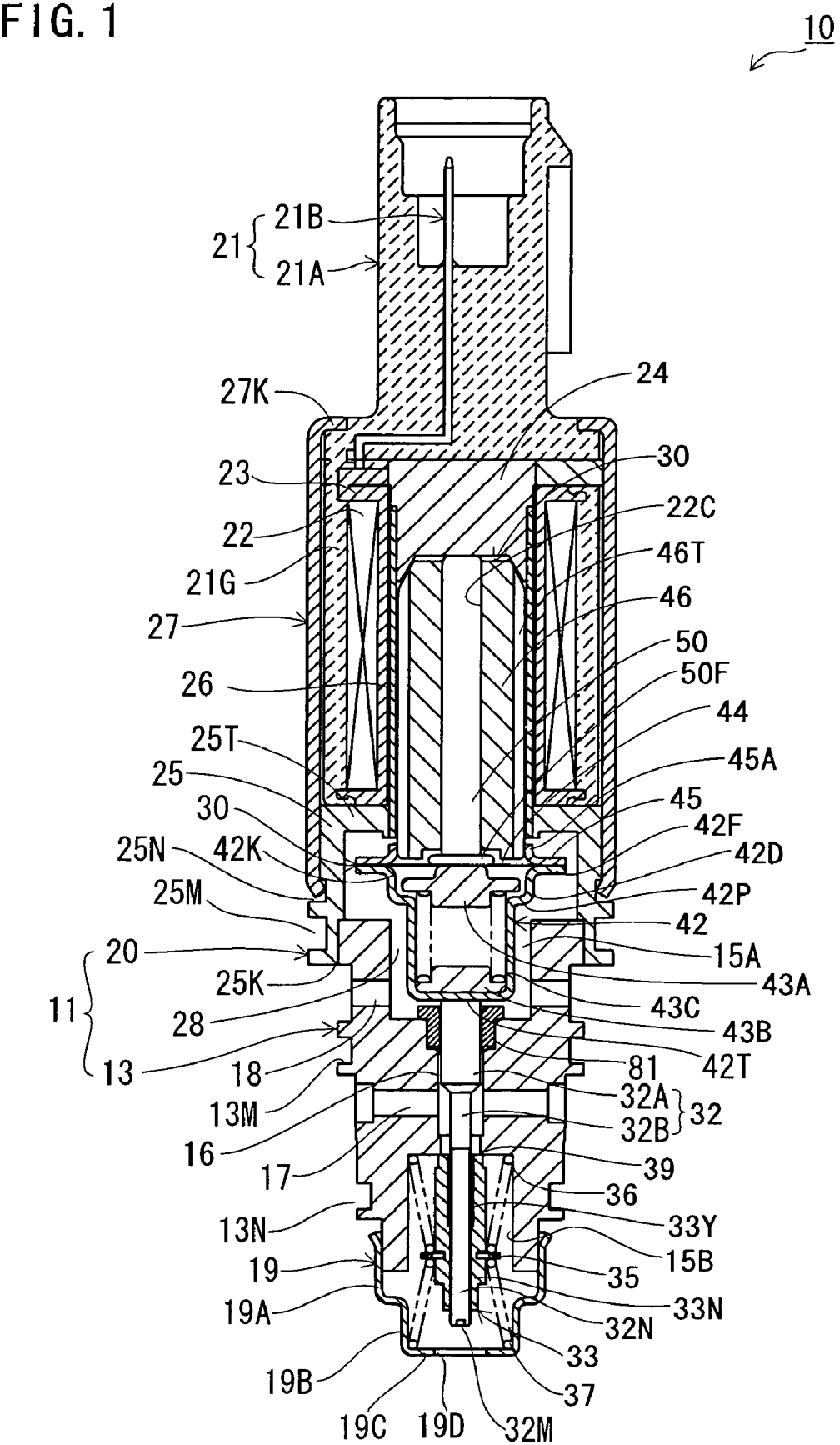
FIG. 1 is a longitudinally sectional side view of the pressure control valve in accordance with an embodiment of the present invention.

An embodiment of the present invention will be described with reference to FIGS. 1 to 6. Referring to FIG. 1, a pressure control valve in accordance with the embodiment of the invention is designated by reference numeral 10. The pressure control valve 10 comprises a vertically extending shaft-like body 11 and a movable shaft section 30 accommodated in the body 11 so as to be movable. The body 11 can be divided at an axially middle thereof into a distal body 13 and a proximal body 20.

The distal body 13 has a columnar structure with an outer diameter gradually decreased as it departs from the proximal body 20. The distal body 13 has both end faces formed with recesses 15A and 15B respectively. A shaft hole 16 is formed through a central portion of the distal body 13 so as to extend between the recesses 15A and 15B. The shaft hole 16 has an open end located away from the proximal body 20 and serving as a valve port 39.

The distal body 13 has an axially middle portion formed with a branch hole 17 perpendicular to a middle portion of the shaft hole 16. The distal body 13 further has a fluid hole 18 located at a portion thereof near the proximal body 20 so as to be perpendicular to the recess 15A. An outer circumference of the distal body 13 is formed with two O-ring grooves 13M and 13N between the fluid hole 18 and the branch hole 17 and between the branch hole 17 and an opening of the recess 15B respectively.

A cap 19 is fitted with a distal end of the distal body 13 at a valve port 39 side. The cap 19 includes a large-diameter cylindrical portion 19A and a small-diameter cylindrical portion 19B aligned axially. The small-diameter cylindrical portion 19B has a distal end provided with a bottom wall 19C. The bottom wall 19C has a centrally located through hole 19D. The large-diameter portion 19A is force-fitted with the distal end of the distal body 13 so that a fluid flows through the hole 19C into and out of the cap 19.

The proximal body 20 comprises a connector 21, a solenoid 22, an end cylinder 25, an assysleeve 27, etc. all assembled together. The connector 21 supplies electric power to the solenoid 22 and comprises a connector housing 21A and a terminal fitting 21B provided in the connector housing.

The solenoid 22 comprises a bobbin 23 and an electric wire wound on the bobbin. The bobbin 23 has an end at which the terminal fitting 21B of the connector 21 is connected to the electric wire. The connector 21 includes an outer cylinder 21G formed integrally therewith. The outer cylinder 21G is attached to the solenoid 22 so as to cover an outer circumferential face of the bobbin 23, whereby the connector 21 and the solenoid 22 are fixed to each other.

A hole is defined inside the solenoid 22. A part of the hole at the connector 21 side is closed by a terminal wall 24. The terminal wall 24 is made of a magnetic material. An end cylinder 25 is provided on an end of the solenoid 22 opposed to the connector 21. The end cylinder 25 has an end closed by a bottom wall 25T applied to the end face of the solenoid 22. A guide cylinder 26 is fitted into the solenoid 22.

A fitting portion 25K serving as adjusting means in the invention is provided on an end of the end cylinder 25 opposed to the bottom wall 25T. A fitting portion 13K serving as adjusting means in the invention is provided on an end of the distal body 13. The fitting portion 13K is force-fitted into the fitting portion 25K. The end cylinder 25 has an open end which includes an outer circumference formed with an O-ring groove 25M.

An assysleeve 27 is fitted with the outer cylinder 21G. The assysleeve 27 includes an engagement wall 27K extending inward from one end of the cylinder. The connector 21, solenoid 22 and end cylinder 25 are sequentially inserted into the other open end of the assysleeve 27. The distal end of the connector 21 protrudes outward from one end of the assysleeve 27. The distal end of the connector 21 is engaged with the engagement wall 27K of the assysleeve 27. The assysleeve 27 has the other end deformed or bent toward an engagement groove 25N formed in an outer circumference of the end cylinder 25. The above-described connector 21, solenoid 22, end cylinder 25 and assysleeve 27 are assembled together into the proximal body 20.

In the embodiment, for example, a movable shaft 30 is assembled onto the distal body 13 and thereafter, the distal body 13 is fitted into the proximal body 20. An interior of the proximal body 20 and an interior of the recess 15A of the distal body 13 constitute a pressure detecting chamber 28 in the invention.

A communication shaft 32 is inserted through the shaft hole 16 of the distal body 13. The communication shaft 32 has a distal end protruding from an inner wall of the recess 15B at the distal end side of the distal body 13. A valve element 33 is assembled onto a protruding portion of the shaft 32. More specifically, the communication shaft 32 includes a large-diameter portion 32A located at the pressure detecting chamber 28 side and a small-diameter portion 32B located at a side spaced away from the communication shaft 32. The branch hole 17 communicates with a valve port 39 via a gap between the small-diameter portion 32B and the inner circumferential face of the recess 15B. The small-diameter portion 32B includes a portion exposed from the inner wall of the recess 15B. The exposed portion is formed with a male thread 32N serving as adjusting means in the invention. The small-diameter portion 32B has a distal end formed with a tool groove 32M with which a tool such as screw driver is engageable.

Figure 4:
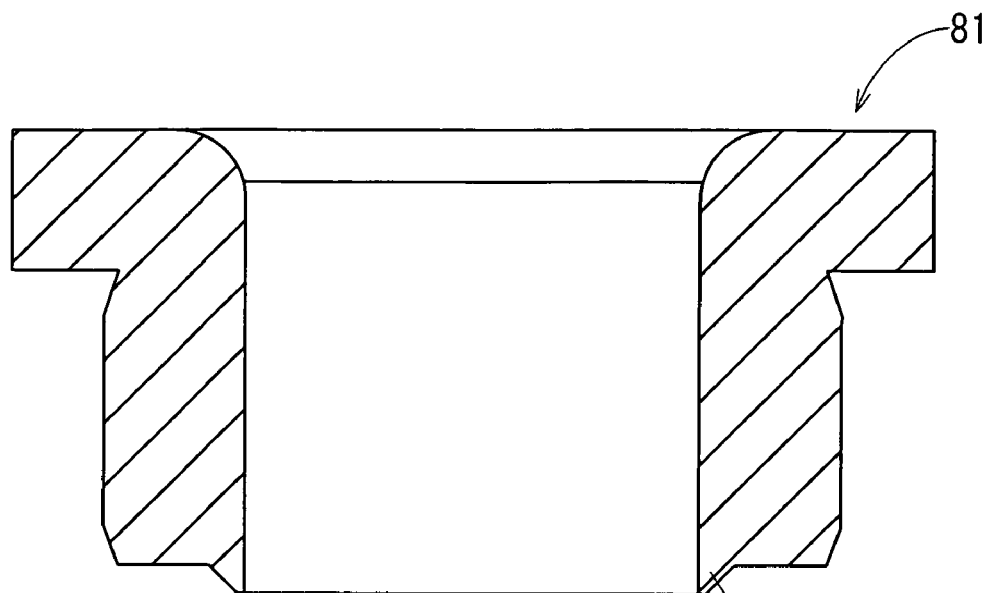
FIG. 4 is an exploded longitudinal side section showing a distal body, packing plate and bush.
Figure 4:
Figure 4:
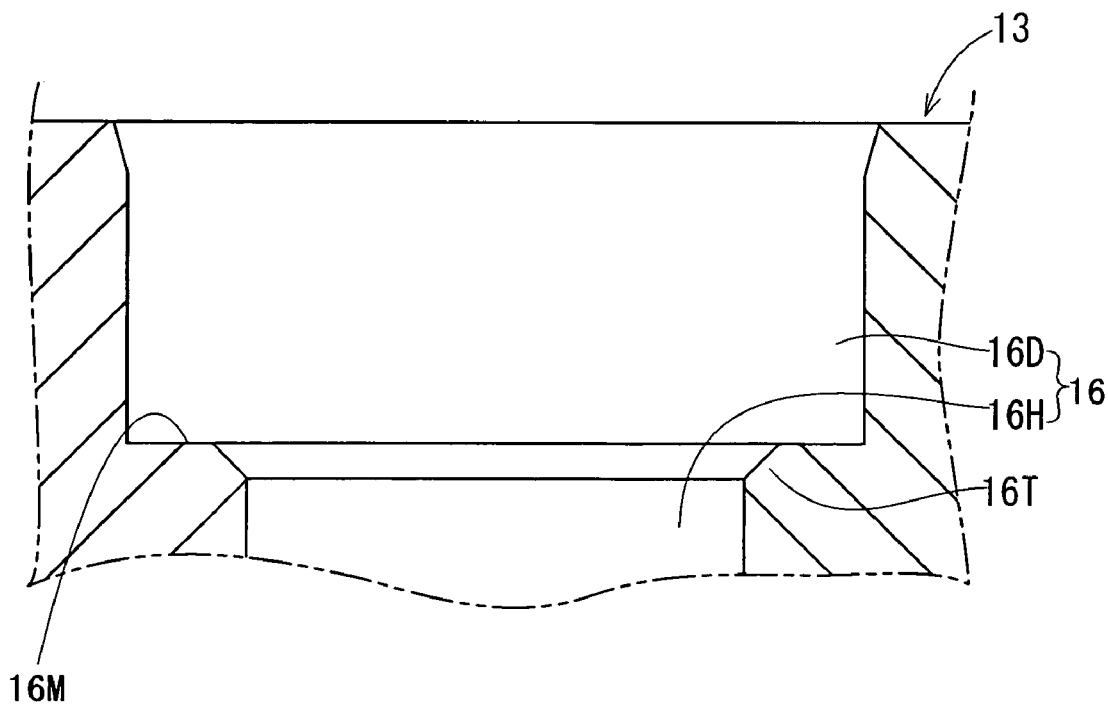

A packing plate 80 seals a gap between an outer circumference of the large-diameter portion 32A of the shaft 32 and the inner circumference of the shaft hole 16. More specifically, as shown in FIG. 4, the distal body 13 has a shaft hole large-diameter portion 16D formed by spreading an opening edge of the shaft hole 16 located at the pressure detecting chamber 28 side. The large-diameter portion 16D has an inner wall 16M perpendicular to the shaft hole 16. The hollow disc-shaped packing plate 80 serving as a sealing member in the invention is provided on the inner wall 16M. The packing plate 80 has a smaller inner diameter than a main portion 16H of the centrally open shaft hole 16 of the inner wall 16M. Furthermore, the main portion 16H has an open edge in the inner wall 16M. The open edge of the main portion 16H is formed with a tapered face 16T.

Figure 5:
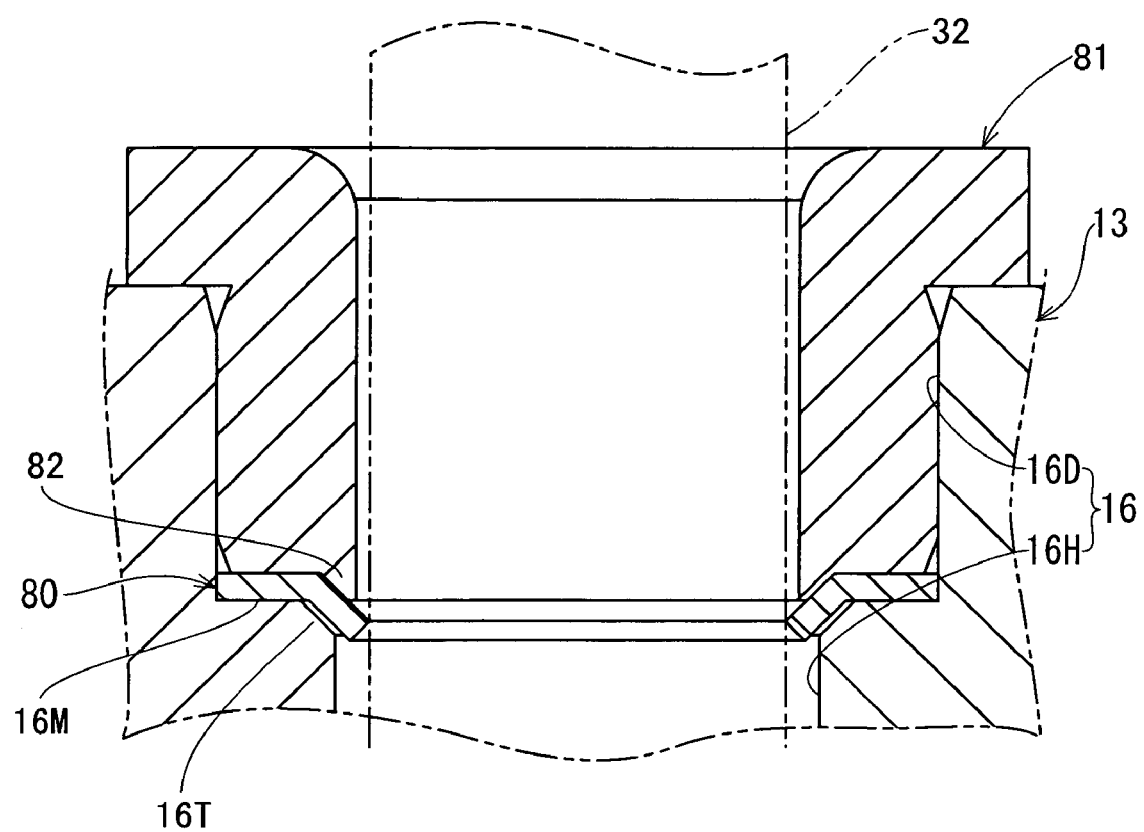
FIG. 5 is a longitudinally sectional side view of the distal body, packing plate and bush assembled together.

A circularly cylindrical bush 81 is force-fitted into the large-diameter portion 16D, as shown in FIG. 5. A packing plate 80 is held between the inner wall 16M and the bush 81. The bush 81 includes a pressing protrusion 82 protruding from an inner edge thereof toward the packing plate 80. The pressing protrusion 82 is formed into an annular shape and surrounds an overall inner edge of the bush 81 as shown in FIG. 4. An outer diameter of the annular portion is gradually decreased as it approaches a distal end of the pressing protrusion 82 into a conical shape. As the result of the foregoing construction, the inner edge of, the packing plate 80 is pressed by the pressing protrusion 82 thereby to be deformed into a funneled shape as shown in FIG. 5, thereby being opposed to the tapered face 16T with a small gap therebetween. The funneled portion of the packing plate 80 is spread by the communication shaft 32 thereby to adhere to the outer circumferential face of the communication shaft 32 (more specifically, the large-diameter portion 32A), whereby the branch hole 17 and pressure detecting chamber 28 are separated in an airtight manner from each other. Furthermore, even when a fluid pressure in the branch hole 17 is applied to the packing plate 80, the diameter of the funneled portion of the packing plate 80 is reduced such that the funneled portion is pressed against the communication shaft 32 with the result of increase in the airtightness. Consequently, a fluid can reliably be prevented from flowing from the branch hole 17 to the pressure detecting chamber 28.

Figure 2:
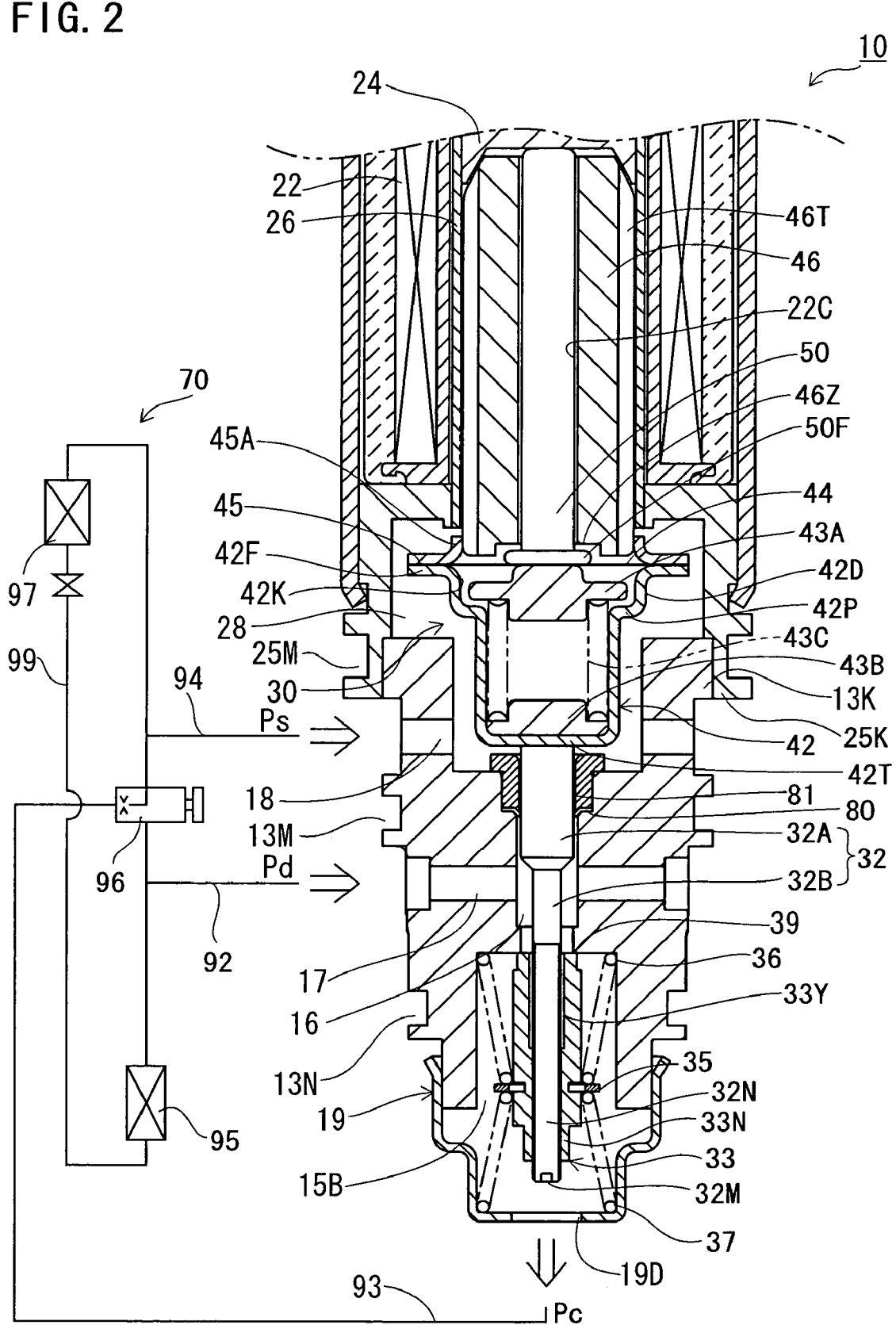
FIG. 2 is a longitudinally sectional side view of the pressure control valve in a closed state.
Figure 3:
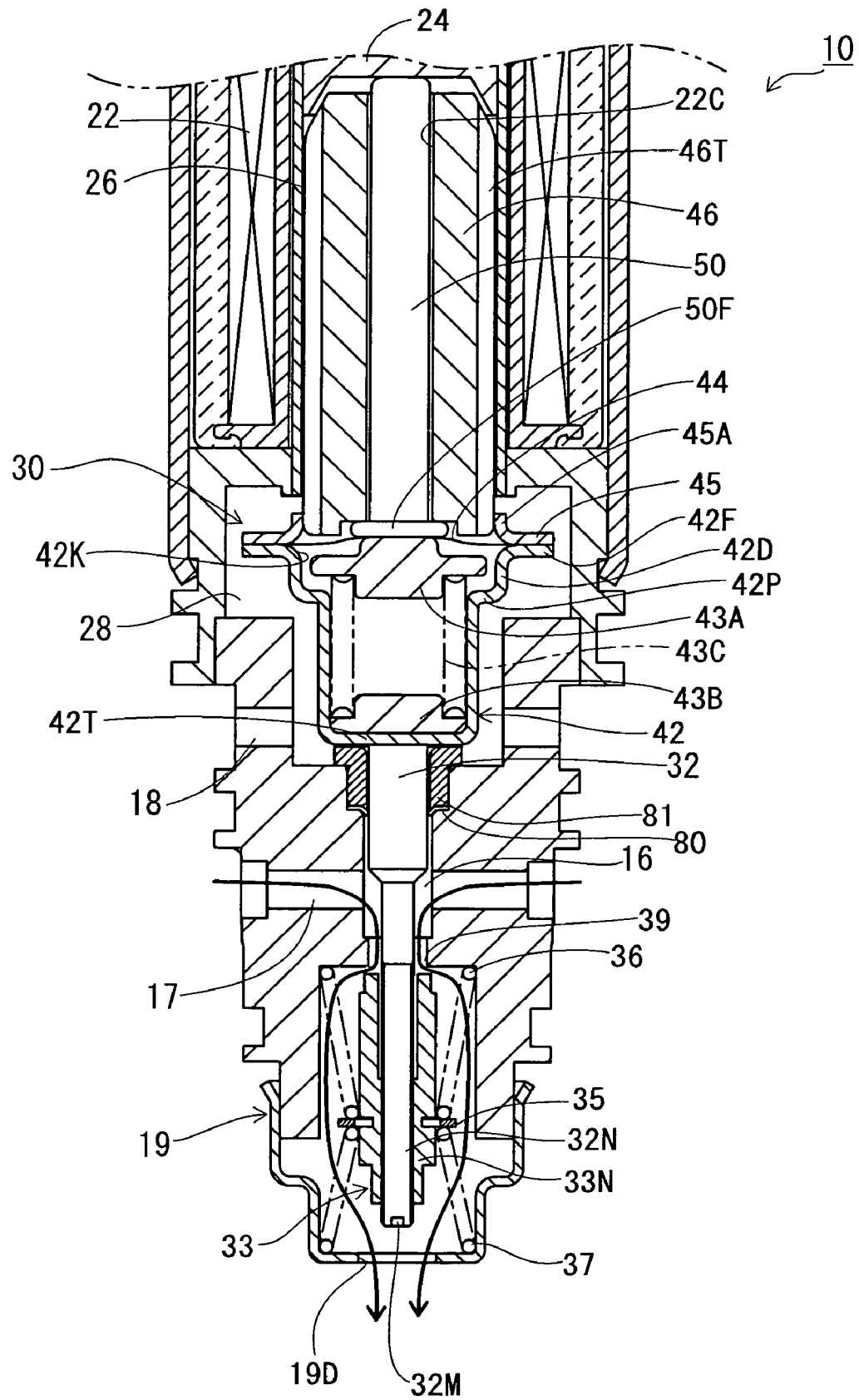
FIG. 3 is a longitudinally sectional side view of the pressure control valve in an open state.

The valve element 33 is threadingly engaged with the male thread 32N of the communication shaft 32 as shown in FIG. 2. The valve element 33 is formed into a cylindrical shape. The valve element 33 has an inner face including an axial half portion formed with a loosely fitted portion 33Y and the other half portion formed with a female thread 33N serving as adjusting means in the invention. The loosely fitted portion 33Y is loosely fitted with the male thread 32N of the communication shaft 32 and then, the valve element 33 is turned relative to the communication shaft 32 when the distal end of the communication shaft 32 abuts against the female thread 33N of the valve element 33, whereby the male and female threads 32N and 33N are threadingly engaged with each other. Furthermore, a space is defined between the inner face of the valve element 33 and the outer face of the communication shaft 32. The space is closed by a sealing adhesive agent, for example.

An E-ring 35 is attached to an axially middle of outer periphery of the valve element 33 and projects sidewise. A first auxiliary spring 36 is provided between the inner wall of the recess 15B of the distal body 13 and the E-ring 35. A second auxiliary spring 37 is provided between the bottom wall 19C of the cap 19 attached to the distal body 13 and the E-ring 35. Each of the auxiliary spring 36 and 37 has a conical spring structure in which the E-ring 35 side has a smaller diameter.

A pressure sensing cylindrical member 42 is fixed to the end thereof located opposite the valve element 33. The cylindrical member 42 has an end closed by a bottom wall 42T. The end of the communication shaft 32 is fixed to a central outer face of the bottom wall 42T. The pressure sensing cylindrical member 42 has the other end located away from the communication shaft 32 and formed with a larger-diameter portion 42D.

A pair of discs 43A and 43B are accommodated in the pressure sensing cylindrical member 42 and arranged axially. A built-in spring 43C is interposed between the discs 43A and 43B so as to be expanded and contracted. The disc 43A is disposed so that an outer circumference thereof is normally spaced away from the larger-diameter portion 42D and an inner wall 42P of the pressure sensing cylindrical member 42. Consequently, an amount of movement of the disc 43A to an inner interior of the cylindrical member 42 is limited so that a diaphragm is prevented from excessive flexure as will be described later.

A flange 42F projects sidewise from an opening edge of the pressure sensing cylindrical member 42. The diaphragm 44 is placed on the flange 42F and a fixing disc 45 is further placed on the flange 42F. The fixing disc 45 and flange 42F are welded together and the diaphragm 44 is attached to the opening edge of the pressure sensing cylindrical member 42 so as to close an open end 42K. The welding is carried out in a vacuum working space. Accordingly, the interior of the cylindrical member 42 closed by the diaphragm 44 is generally vacuum. The disc 43A is adherent closely to the diaphragm 44 so that the built-in spring 43C is expanded and contracted with flexure of the diaphragm 44. The diaphragm 44 is formed with a plurality of concentric circular ribs giving flexibility to the diaphragm. The circular ribs are shown by reference symbol 44A in FIG. 11 and will be described in detail in a fourth embodiment.

The fixing disc 45 is made of an annular plate having substantially the same size as the flange 42F. The fixing disc 45 includes a cylindrical support wall 45A formed by causing an inner circumferential edge of the annular plate to rise at the side located away from the cylindrical member 42. A plunger 46 is fixed to the support wall 45A. The plunger 46 is circularly cylindrical and is accommodated inside the solenoid 22 so as to be movable. The plunger 46 has an end fitted in the support wall 45A.

A space is defined between an end of the plunger 46 and the diaphragm 44. A plurality of vertical grooves 46T are formed in an outer circumference of the plunger 46. Pressure of a fluid in the pressure detecting chamber 28 is applied via the vertical grooves 46T to diaphragm 44.

The plunger 46 has a flat end at the terminal wall 24 side. The flat end of the plunger 46 has an outer edge formed with a tapered face corresponding to the terminal wall 24.

A stretching member 50 is inserted inside the plunger 46. The stretching member 50 is bar-shaped and has an end provided with a disc 50F which is in abutment with the diaphragm 44 so that the stretching member 50 is moved in the plunger 46 with deformation of the diaphragm 44. The plunger 46 has a recess 46Z formed in an end thereof so as to correspond to the disc 50F as shown in FIG. 2. The disc 50F is abutted against an inner wall of the recess 46Z thereby to limit the movement stroke of the stretching member 50, whereby the diaphragm 44 is prevented from excessive flexure. The stretching member 50 has an end located opposite the diaphragm 44 and set so as to protrude slightly from the end face of the plunger 46 when the diaphragm 44 is flat.

Adjustment of the pressure control valve 10 will now be described. In order that an adjusting work may be carried out, the pressure control valve 10 is set in an adjusting apparatus (not shown) and a fluid is supplied via the fluid hole 18 into the pressure detecting chamber 28. The fluid is also supplied from the branch hole 17 intro the shaft hole 16. Furthermore, the valve port 39 is closed by the valve element 33. An excitation current i supplied to the solenoid 22 is changed so that fluid pressure Ps in the pressure detecting chamber 28 is measured when the valve element 33 of the pressure control valve 10 is opened under the condition of each value of excitation current i. More specifically, the following equation (1) holds:

TABLE 1

| | |
|---|---|
| Fluid pressure in the pressure detecting chamber 28 | Ps |
| Fluid pressure in the branch hole 17 | Pd |
| Fluid pressure outside the valve port 39 | Pc |
| Cylinder area of the diaphragm 44 | S1 |
| Diameter of larger-diameter portion 32A of the communication shaft 32 | S2 |
| Diameter of smaller-diameter portion 32B of the communication shaft 32 | S2' |
| Inner diameter of valve port 30 | S3 |
| Spring force of built-in spring 43C | f1 |
| Spring force of first auxiliary spring 36 | f2 |
| Spring force of second auxiliary spring 37 | f3 |

$$S2 \cdot Ps + Fi + S1 \cdot Ps + (S3 - S2) \cdot Pd + f3 = f1 + f2 + S3 \cdot Pc \quad (1)$$

When re-arranging equation (1), fluid pressure Ps in the pressure detecting chamber 28 is shown as a linear equation of excitation current i supplied to the solenoid 22, by the following equation (2)

$$Ps = Ai + B \quad (2)$$

Figure 6:
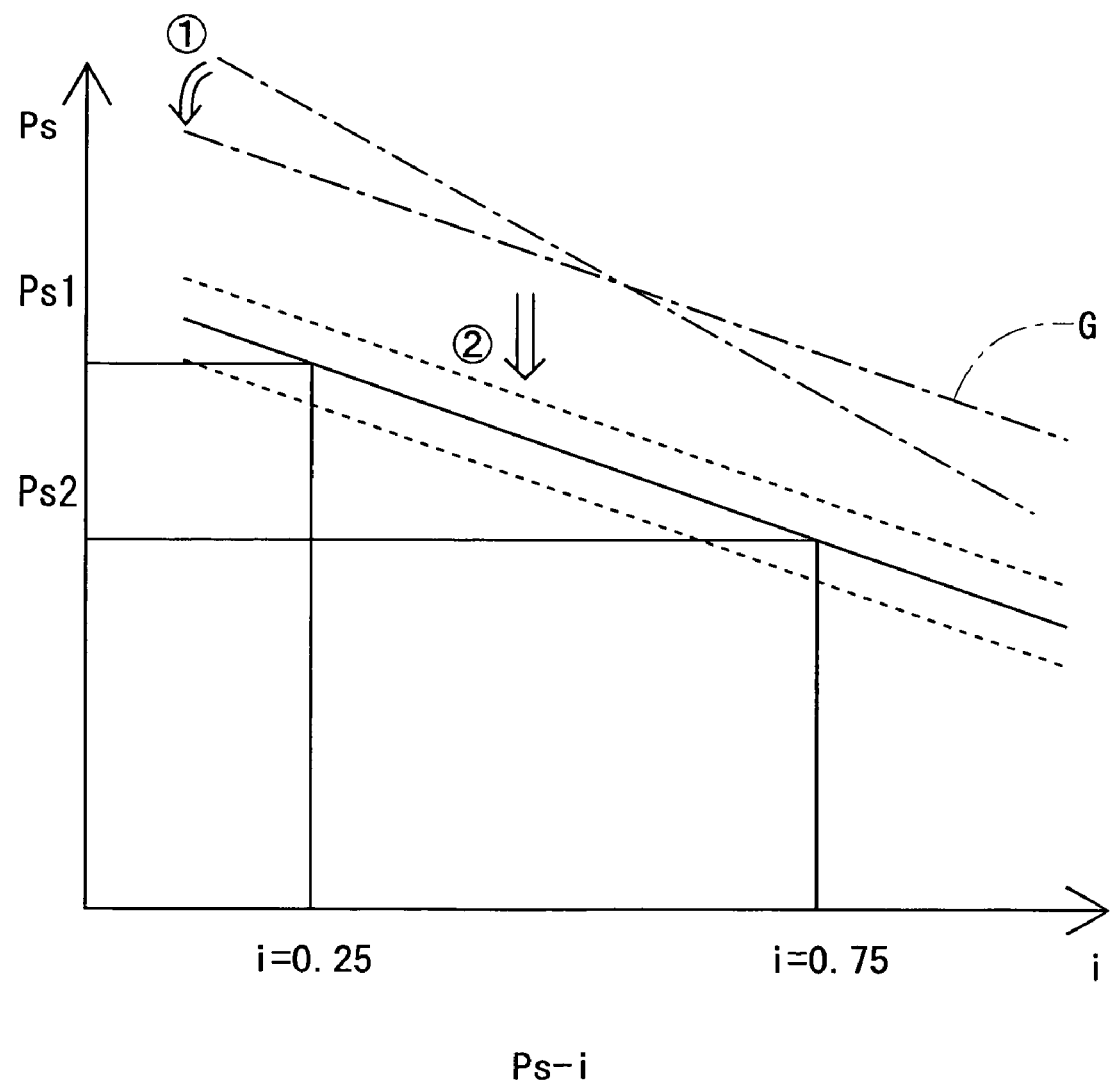
FIG. 6 is a graph showing the relationship between the fluid pressure in the pressure detecting chamber and the solenoid current.

The linear equation (2) is represented by graph G of FIG. 6. A gradient of graph G changes according to a threading engagement position where the valve element 33 is brought into 15 threading engagement with the communication shaft 32. Then, under the condition where the fluid pressure in the branch hole 17 is rendered constant and the excitation current i supplied to the solenoid 22 is set at 0.25 or 0.75 A, the fluid pressure Ps in the pressure detecting chamber 28 is measured when the valve 20 element 33 of the pressure control valve 10. A gradient A (A in equation (2)) of graph G as shown in FIG. 6 is obtained from the results. The aforesaid threading engagement position is adjusted so that the gradient value A becomes a predetermined set value (required value).

Subsequently, a fitting position where the cap 19 is fitted with the distal body 13 is changed so that the fluid pressure Ps at which the valve element 33 is opened when the excitation current i is 0.25 A, for example becomes the set value (required value) so that the spring force of the second auxiliary spring 37 is adjusted. Thus, the assembly including adjustment of the pressure control valve is completed.

The operation of the pressure control valve 10 will now be described. The pressure control valve 10 of the embodiment is disposed in a refrigerant flow passage 70 of an air conditioner as shown in FIG. 2, for example. More specifically, the air conditioner is provided with a valve insertion hole (not shown) as well as with an adjusting device. The pressure control valve 10 is inserted into the valve insertion hole to be assembled. Since the pressure control valve 10 has such a structure that the connector 21 stands at the side opposite to the valve element 33, the pressure control valve 10 can be inserted into the valve insertion hole without interference of the connector 21 with an inner wall of the valve insertion hole. Furthermore, respective ends of a fluid supply passage 92, a fluid discharge passage 93 and a control flow passage 94 of the flow passage 70 are open in an inner wall of the valve insertion hole. The fluid discharge passage 93 communicates with a space inside the cap 19. The fluid supply passage 92 communicates with the branch hole 17. The control flow passage 94 communicates with the pressure detecting chamber 28.

The flow passage 70 includes a circulation flow passage 99 through which a refrigerant can be circulated. The flow passage 70 further includes an evaporator 97, a condenser 95 and a compressor 96 all provided in the middle of the circulation flow passage 99. The pressure control valve 10 of the invention is incorporated in the compressor 96. The control flow passage 94 branches off a part of the circulation flow passage 99 between the compressor 96 and the evaporator 97. The fluid supply passage 92 branches off a part of the circulation flow passage 99 between the condenser 95 and the compressor 96. Furthermore, the fluid discharge passage 93 is connected via an orifice to the flow passage 70.

In the pressure control valve 10 assembled into the air conditioner, the valve element 33 is closed when the fluid pressure Ps in the pressure detecting chamber 28 is higher than a predetermined reference pressure. The valve element 33 is opened when the fluid pressure Ps in the pressure detecting chamber 28 is lower than the reference pressure. More specifically, the fluid pressure Ps in the pressure detecting chamber 28 is applied to the diaphragm 44 such that the latter is elastically deformed. When the fluid pressure Ps in the pressure detecting chamber 28 becomes higher than the predetermined pressure, both ends of the stretching member 50 abut against the terminal wall 24 and the diaphragm 44 respectively as shown in FIG. 2. In this case, the valve element 33 is pressed against the edge of the valve port 39 by the sucking force of the terminal wall 24 and the plunger 46 and by spring force of the auxiliary spring 36, so that the valve port 39 is closed.

When the fluid pressure Ps in the pressure detecting chamber 28 becomes lower than the predetermined pressure, the spring force of the built-in spring 43C raises the diaphragm 44 from the open end of the pressure sensing cylindrical member 42, whereby the movable shaft 30 is moved downward relative to the body 11. Consequently, the valve element 33 is parted from the edge of the valve port 39, which is thereby opened. The fluid then flows from the fluid supply passage 92 through the branch hole 17 and valve port 39 into the fluid discharge passage 93.

When the excitation current i supplied to the solenoid 22 is increased, the fluid pressure Ps in the pressure detecting chamber 28 becomes lower upon opening of the valve element 33 as shown in FIG. 6.

In the pressure control valve 10 of the embodiment, the diaphragm 44 is used as the pressure sensing member less expensive than the bellows in order that the valve element 33 may be controlled so as to be opened and closed. Moreover, the terminal wall 24 and the diaphragm 44 are spaced away from each other while the valve port 39 is closed by the valve element 33. Even if a distance between the terminal wall 24 and the diaphragm 44 differs from one case to another for the assembly's sake, the distance between the terminal wall 24 and the diaphragm 44 is changed by the male and female threads 32N and 33N of the communication shaft 32 and the valve element 33 respectively, so that the spring force of the diaphragm 44 against the stretching member 50 can be adjusted. This can reduce the variations in the correspondence relation between the fluid pressure Ps and opening and closure of the valve element 33. Consequently, the valve element can be controlled by the use of the diaphragm 44 with the same accuracy as that by the use of bellows.

In the foregoing embodiment, the diaphragm 44 and the pressure sensing cylindrical member 42 are disposed in a space defined between the solenoid 22 and the distal body 13. Accordingly, the size of the diaphragm 44 can be determined without consideration of the inner diameter of the solenoid 22. Furthermore, the plunger 46 is formed into a cylindrical shape, and the stretching member 50 is inserted through the central part of the plunger 46. As a result, the stretching member 50 can stably be moved.

Still furthermore, the built-in spring 43C is compressed between the bottom wall 42T of the pressure sensing cylindrical member 42 and the diaphragm 44. Consequently, an amount of deformation of the diaphragm 44 can be set at a desired value relative to the fluid pressure in the pressure detecting chamber 28.

Figure 7:
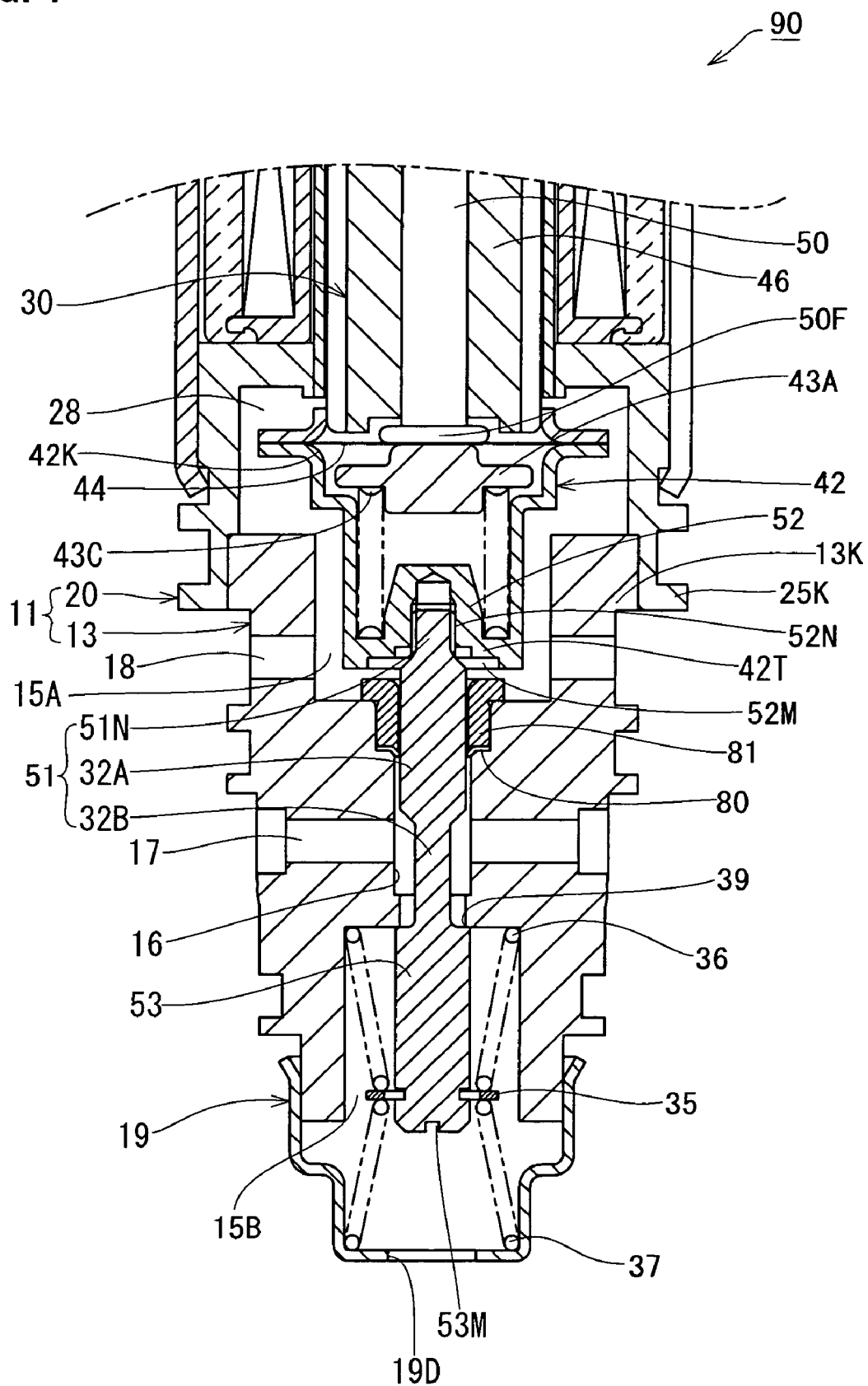
FIG. 7 is a longitudinally sectional side view of the pressure control valve in accordance with a second embodiment of the present invention.

FIG. 7 illustrates a second embodiment of the invention. In the second embodiment, the valve element 53 and the communication shaft 51 are formed integrally with each other, and the pressure sensing cylindrical member 42 and the communication shaft 51 are discrete from each other. The male thread 51N formed on one end of the communication shaft 51 is brought into threading engagement with the female thread 52N formed in the bottom wall 42T of the pressure sensing cylindrical member 42. Each of the male and female threads 51N and 52N serves as adjusting means in the invention. The second embodiment differs from the first embodiment in the above-described respects. Only the difference between the first and second embodiments will be described in detail later. Identical or similar parts in the second embodiment are labeled with the same reference symbols as those in the second embodiment, and the description of these parts will be eliminated.

The pressure sensing cylindrical member 42 includes a bottom protrusion 52 protruding from the central inner face of the bottom wall 42T toward the diaphragm 44. The built-in spring 43C is fitted with the bottom protrusion 52. Furthermore, the bottom wall 42T has a female thread 52N formed in the central outer face thereof (underside as viewed in FIG. 7). The female thread 52N extends along the center of the bottom protrusion 52 and is open only to the outer face of the bottom wall 42T. The distal end side of the bottom protrusion is closed. The bottom wall 42T further has a circular recess 52M with the centrally located female thread 52N.

The communication shaft 51 includes a smaller-diameter portion 32B, larger-diameter portion 32A, male thread 51N arranged sequentially from the valve element 53 side. The male thread 51N has substantially the same diameter as the smaller-diameter portion 32B. The larger-diameter portion 32A has both tapered ends continuous to the smaller-diameter portion 32B and male thread 51N respectively. The male thread 51N is in threading engagement with the female thread 52N of the pressure sensing cylindrical member 42. Furthermore, the side of the valve element 53 spaced away from the communication shaft 51 has a distal end formed with a tool groove 53M with which a tool such as a screwdriver is engageable.

When the pressure control valve 90 of the second embodiment is assembled, the communication shaft 51 is inserted through the shaft hole 16 of the distal body 13 before the distal and proximal ends are engaged with each other. Under this condition, for example, an adhesive agent is applied to the male thread 51N of the communication shaft 51 and subsequently, the male thread 51N is brought into threading engagement with the female thread 52N of the pressure sensing cylindrical member 42. In this case, the adhesive agent overflowed the female thread 52N is collected in the recess 52M.

Subsequently, the distal and proximal bodies 13 and 20 are fitted with each other. A tool (not shown) is then inserted into a fluid introducing hole 18 to prevent the pressure sensing cylindrical member 42 from turning. A depth of threading engagement of the male and female threads 51N and 52N is changed before the adhesive agent hardens, whereby the distance between the terminal wall 24 (see FIG. 1) and the diaphragm 44. Thus, the-spring force of the diaphragm 44 against the stretching member 50 is adjusted. This can reduce the variations in the correspondence relation between the fluid pressure Ps and opening and closure of the valve element 33. Consequently, the valve element can be controlled by the use of the diaphragm 44 with the same accuracy as that by the use of bellows.

Figure 8:
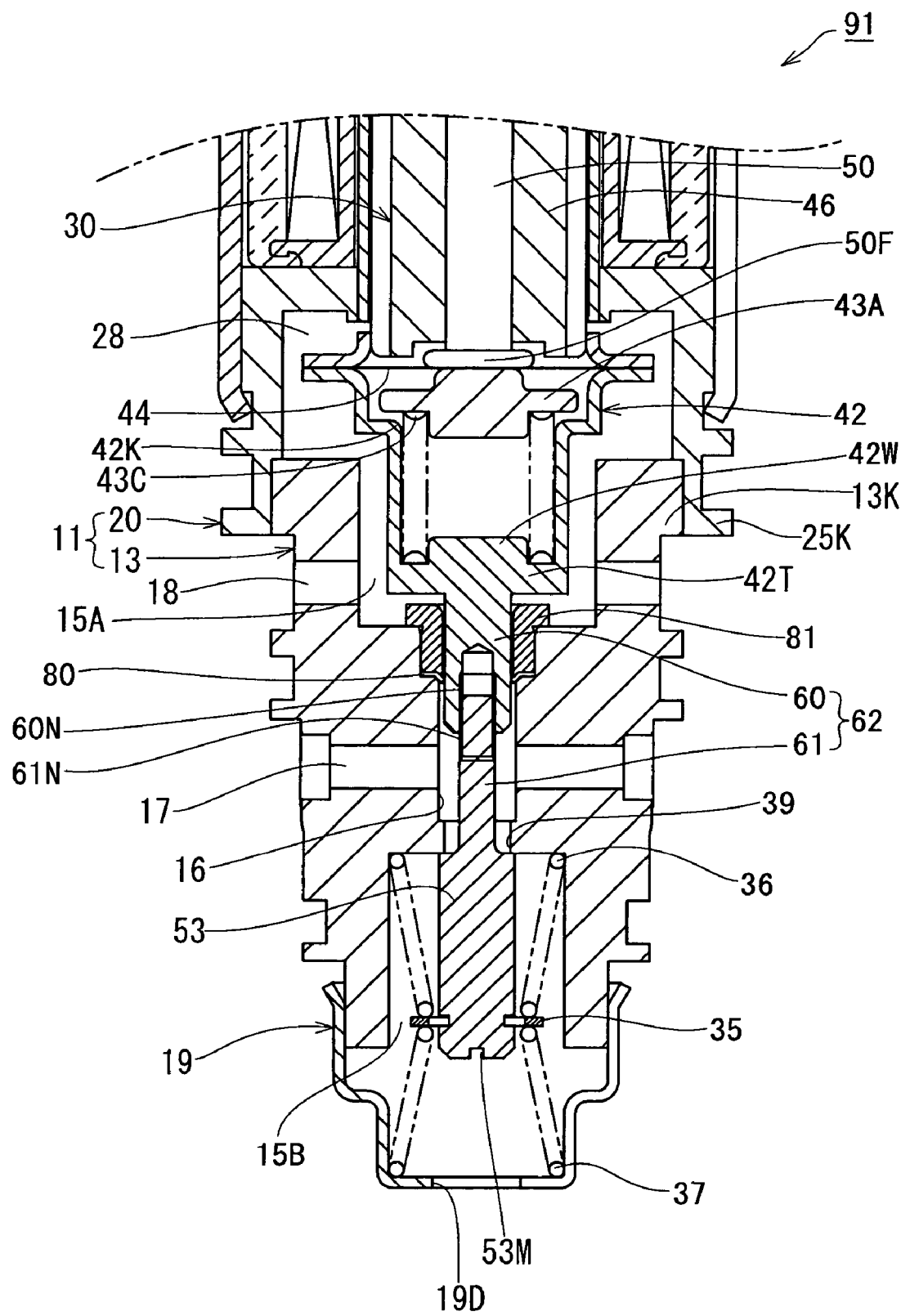
FIG. 8 is a longitudinally sectional side view of the pressure control valve in accordance with a third embodiment of the present invention.

FIG. 8 shows a third embodiment of the invention. The third embodiment differs from the first and second embodiments in the structure of the communication shaft 62. Only the difference between the first and the third embodiment will be described in detail later. Identical or similar parts in the third embodiment are labeled with the same reference symbols as those in the first and second embodiments, and the description of these parts will be eliminated. In the pressure control valve 91 of the third embodiment, a first communication shaft component 60 extends from the pressure sensing cylindrical member 42 to the middle interior of the shaft hole 16. The first component 60 has a distal end formed with a female thread 60N serving as adjusting means in the invention. A second communication shaft component 61 extends from one end of the valve element 53 to the middle interior of the shaft hole 16. The second component 61 has a distal end formed with a male thread 61N serving as adjusting means in the invention.

In assembly of the pressure control valve 91 thus constructed, an adhesive agent is applied to the male thread 61N of the second communication shaft component 61 before the distal and proximal bodies 13 and 20 are fitted with each other. The first and second communication shaft components 60 and 61 are inserted into both ends of the shaft hole 16 respectively. The male and female threads 61N and 60N are then brought into threading engagement with each other in the shaft hole 16. Consequently, the first and second communication shaft components 60 and 61 are connected to each other into the communication shaft 62. In this case, the adhesive agent overflowed the female thread 61N is collected in a stepped portion between the first and second communication shaft components 60 and 61.

Subsequently, the distal and proximal bodies 13 and 20 are fitted with each other. The tool (not shown) is then inserted into the fluid introducing hole 18 to prevent the pressure sensing cylindrical member 42 from turning. The depth of threading engagement of the male and female threads 61N and 60N is changed before the adhesive agent hardens, whereby the distance between the terminal wall 24 (see FIG. 1) and the diaphragm 44. Thus, the spring force of the diaphragm 44 against the stretching member 50 is adjusted. This can reduce the variations in the correspondence relation between the fluid pressure Ps and opening and closure of the valve element 33. Consequently, the valve element can be controlled by the use of the diaphragm 44 with the same accuracy as that by the use of bellows.

FIGS. 9 to 12 illustrate a fourth embodiment of the invention. Only the difference between the first and fourth embodiments will be described in detail later. Identical or similar parts in the fourth embodiment are labeled with the same reference symbols as those in the first embodiment, and the description of these parts will be eliminated.

Figure 9:
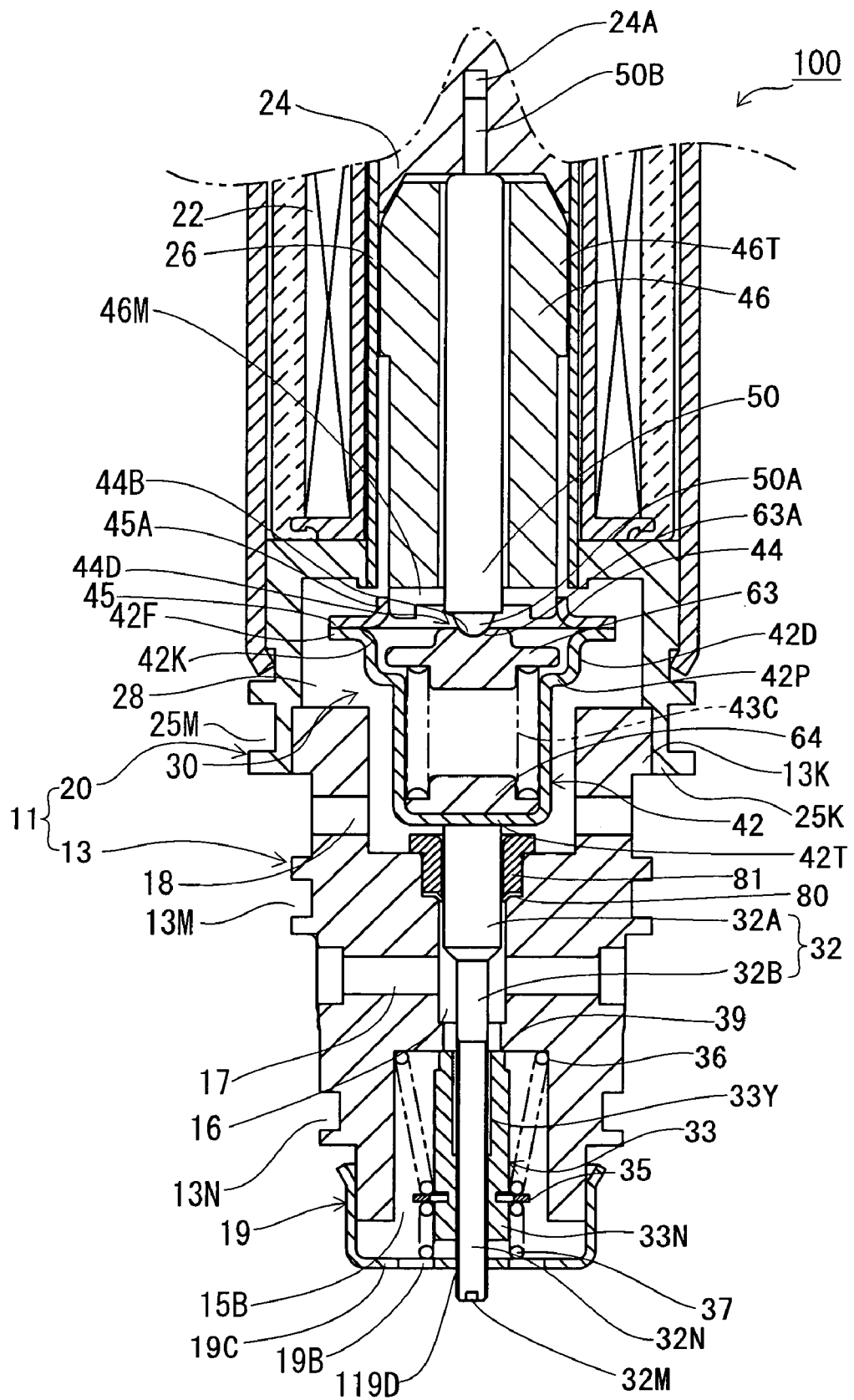
FIG. 9 is a longitudinally sectional side view of the pressure control valve in accordance with a fourth embodiment of the present invention.
Figure 10:
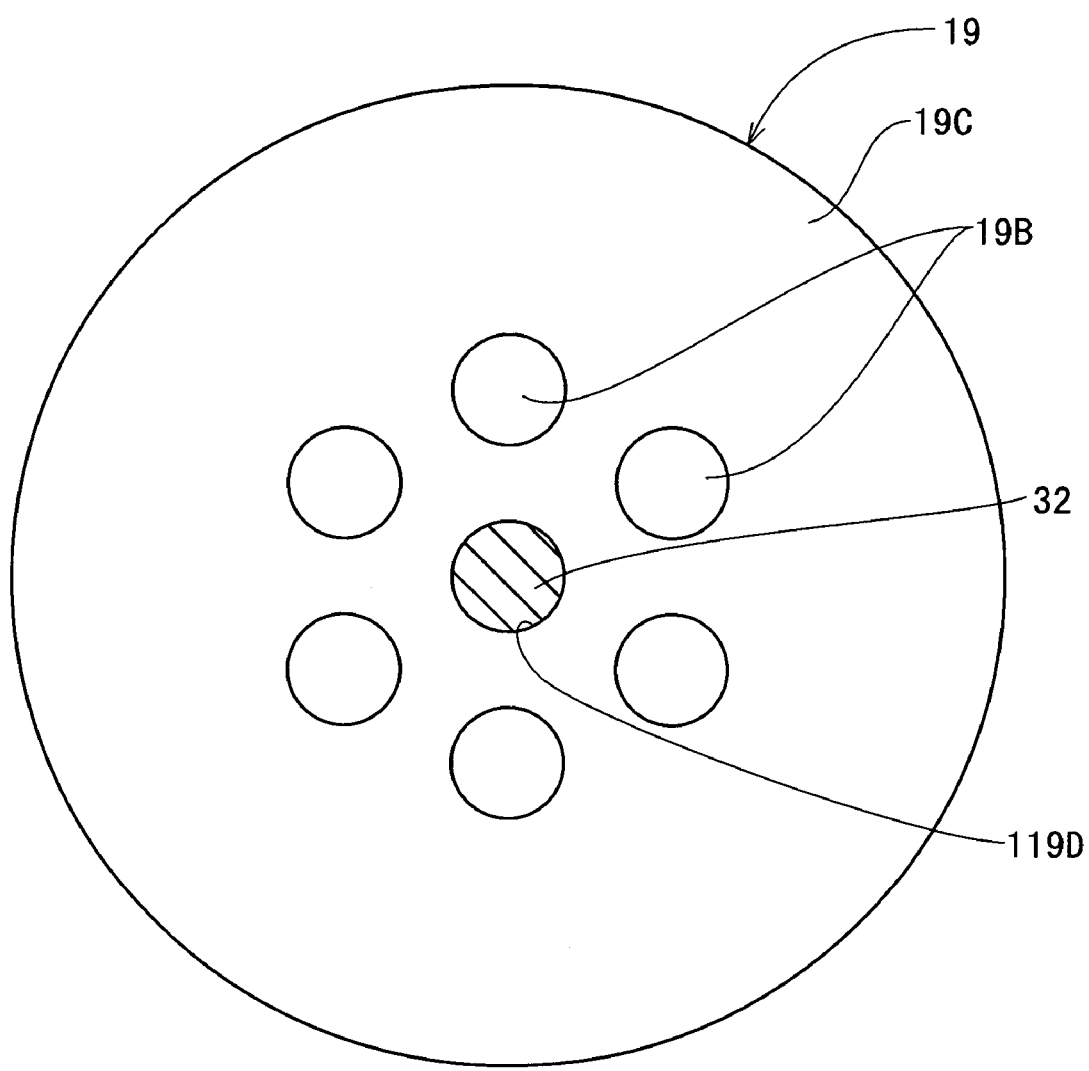
FIG. 10 is a bottom view of the cap.

The distal end of the pressure control valve 100 is provided with the cap 19 corresponding to a distal guide in the invention, as shown in FIG. 9. The cap 19 has a bottom wall 19C formed with a guide hole 119D through which the distal end of the communication shaft 32 extends. Furthermore, the bottom wall 19C has a plurality of fluid pass holes 19B formed therethrough around the guide hole 119D.

Figure 11:
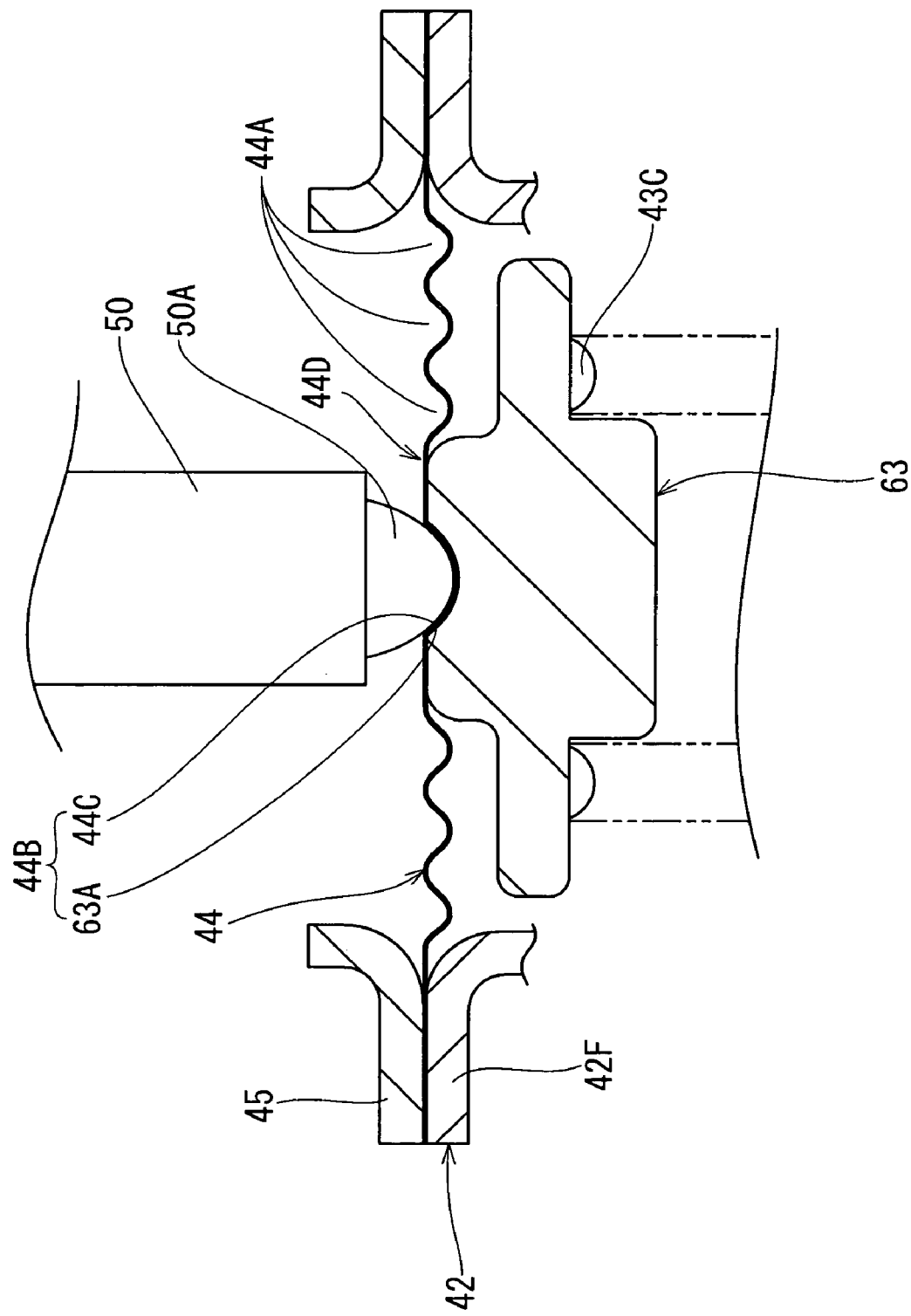
FIG. 11 is a sectional view showing centering protrusion and recess engaging each other.

The pressure control valve 100 includes the diaphragm 44 as in each of the foregoing embodiments. FIG. 11 shows, in exaggeration, a plurality of concentric circular folds or depressions 44A formed on the diaphragm 44. A central part of the diaphragm 44 is vertically displaced with changes in the shape of the folds 44A.

Each circular fold 44A has a centrally located semicircular expansion 44C formed so as to expand semicircularly toward the inside of the pressure sensing cylindrical member 42. Furthermore, an inner adhering disc 63 and a bottom adhering disc 64 are accommodated in the pressure sensing cylindrical member 42 as shown in FIG. 9. The inner adhering disc 63 has embosses formed on an upper side and an underside thereof respectively. The bottom adhering disc 64 has an emboss only on the upper side thereof. The inner adhering disc 63 is applied to the diaphragm 44, whereas the bottom adhering disc 64 is applied to the bottom of the pressure sensing cylindrical member 42. A built-in spring 43C is interposed between the inner and bottom adhering discs 63 and 64 in a compressed state. As a result, an upper side of the inner adhering disc 63 is adherent to the inside of the diaphragm 44. The diaphragm 44 has a central abutment 44D formed on a central portion thereof.

The inner adhering disc 63 includes a face adherent to the diaphragm 44 as shown in FIG. 11. The face adherent to the diaphragm 44 is formed with a semi-circular depression 63A. The semi-circular expansion 44C is placed on the inside of the semi-circular depression 63A, whereupon a centering depression 44B is formed.

The plunger 46 of the pressure control valve 100 has a larger-diameter portion 46T formed on an end thereof located away from the cylindrical member 42, as shown in FIG. 9. The larger-diameter portion 46T has a slightly larger outer diameter. The larger-diameter portion 46T is can be brought into sliding contact with the inner face of the guide cylinder 26. More specifically, the movable shaft 30 comprises the pressure sensing cylindrical member 42, the plunger 46 and the communication shaft 32. The movable shaft 30 has both ends guided by the guide hole 119D of the cap 19 and the guide cylinder 26 respectively thereby to be moved.

The plunger 46 includes an end face at the fixed disc 45 side. A radially extending groove 46M is formed in the end face. The groove 46 has both ends open to the outer face of the plunger 46. Consequently, the fluid pressure in the pressure detecting chamber 28 is also adapted to be applied to the outer face of the diaphragm 44.

In the fourth embodiment, the stretching member 50 includes a stepped slender fixing shaft 50B which is formed on the proximal end thereof. The fixing shaft 50B is fitted into the fixing hole 24A formed in the terminal wall 24 to be fixed in the fixing hole. The centering protrusion 50A is formed on the distal end of the stretching member 50 so as to protrude therefrom. The centering protrusion 50A has such a semi-circular shape as to correspond to the centering depression 44B.

Figure 12:
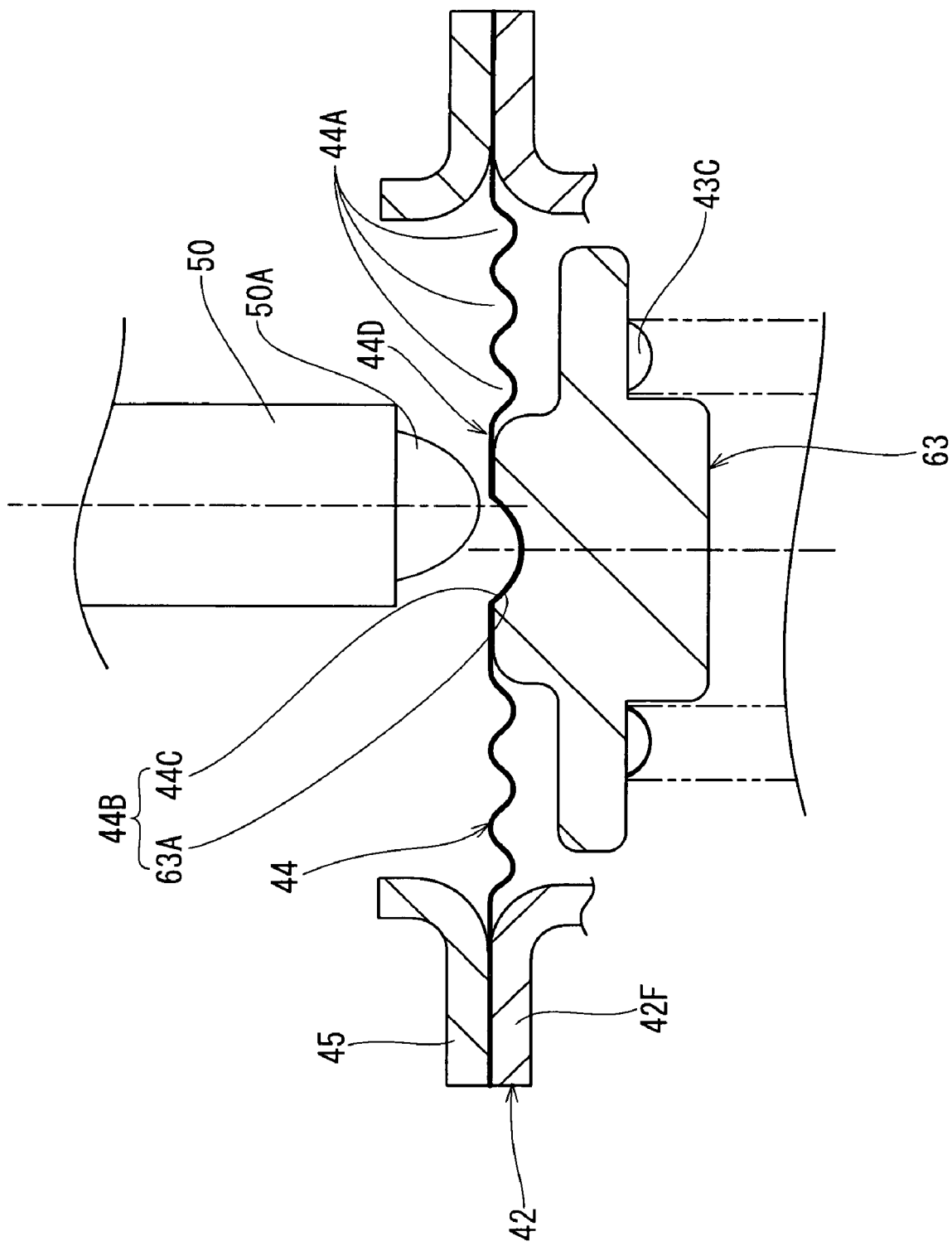
FIG. 12 is a sectional view showing the stretching member and the diaphragm de-centered with respect to each other.
Figure 13:
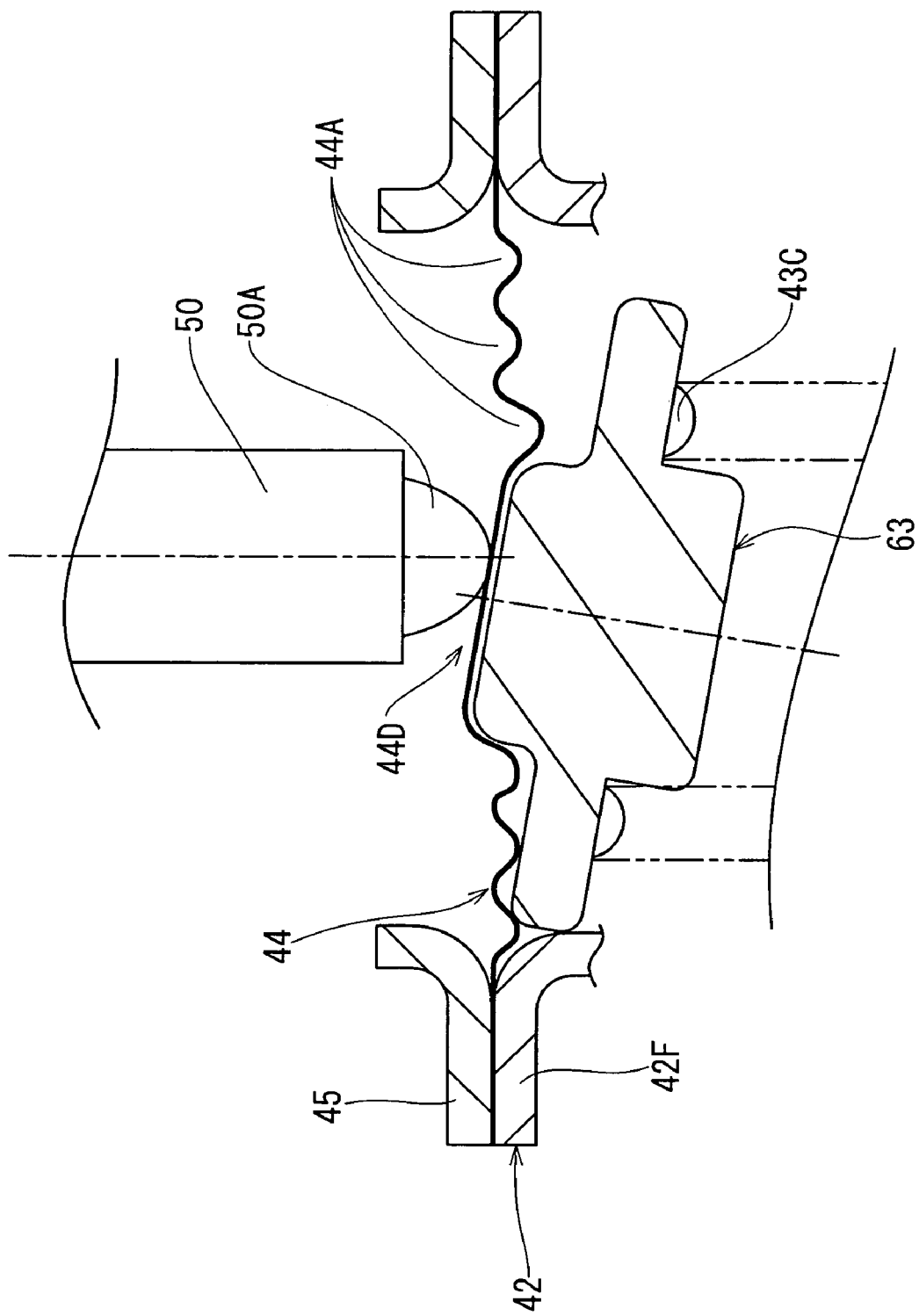
FIG. 13 is a sectional view showing a deformed state of the diaphragm when no centering depression is provided.

The stretching member 50 is abutted against the central abutment portion 44D of the diaphragm 44 in the process of assembly of the pressure control valve 100. In this case, a dimensional error of each component sometimes de-centers the stretching member 50 and the diaphragm 44, as shown in FIG. 12. In the fourth embodiment, however, when the stretching member 50 is pressed against the diaphragm 44, the stretching member 50 is guided by the guide of the outer face of the centering protrusion 50A and the inner face of the centering depression 44B to be positioned at the center of the circular rib 44A of the diaphragm 44.

In the pressure control valve 100 of the fourth embodiment, the diaphragm 44 and the stretching member 50 are centered by the centering protrusion and depression 50A and 44B. Accordingly, an axial force is applied to the center of the circular rib 44A such that the circular rib is deformed uniformly over the circumference, whereupon the spring force of the diaphragm 44 is rendered stable. Consequently, the valve port 39 is opened and closed stably by the valve element 33. In this case, if no centering depression 44B should be provided at the diaphragm 44 side and the diaphragm 44 and the stretching member 50 should be in abutment with each other while de-centered, the circular rib 44A of the diaphragm 44 would not be deformed uniformly over the circumference, whereupon the spring force of the diaphragm would vary. Accordingly, the valve port 39 would be opened and closed unstably by the valve element 33. In the fourth embodiment, however, the above-described de-centering can be prevented by the centering depression 44B and the centering protrusion 50A.

Thus, the stretching member 50 is positioned at the center of the circular rib 44A of the diaphragm 44 by the centering protrusion 50A and the centering depression 44B. Accordingly, the axial force is applied to the center of the circular rib 44A such that the circular rib is deformed uniformly over the circumference, whereupon the spring force of the diaphragm 44 is rendered stable. Consequently, the valve port 39 is opened and closed stably by the valve element 33. Moreover, the movable shaft 30 includes the pressure sensing cylindrical member 42, communication shaft 32 and plunger 46. Both ends of the movable shaft 30 is guided by the guide cylinder 26 and the guide hole 119D of the cap 19 so as to be movable. As a result, an inclination of the movable shaft 30 is limited and accordingly, the resistance due to the sliding contact during the movement thereof is restrained and stabilized. Consequently, the valve port 39 is opened and closed further stably by the valve element 33.

Furthermore, concentration of stress can be prevented since both outer face of the centering protrusion 50A and inner face of the centering depression 44B are generally semi-circular. Further, the strength of the diaphragm 44 can be increased since the inner adhering disc 63 is adhered to the inner face of the diaphragm. Additionally, even if a distance between the terminal wall 24 and the diaphragm 44 differs from one case to another for the assembly's sake, the distance between the terminal wall 24 and the diaphragm 44 is changed by the male and female threads 32N and 33N of the communication shaft 32 and the valve element 33 respectively, so that the spring force of the diaphragm 44 against the stretching member 50 can be adjusted. This can reduce the variations in the correspondence relation between the fluid pressure Ps and opening and closure of the valve element 33. Consequently, the valve element can be controlled by the use of the diaphragm 44 with the same accuracy as that by the use of bellows.

Figure 14:
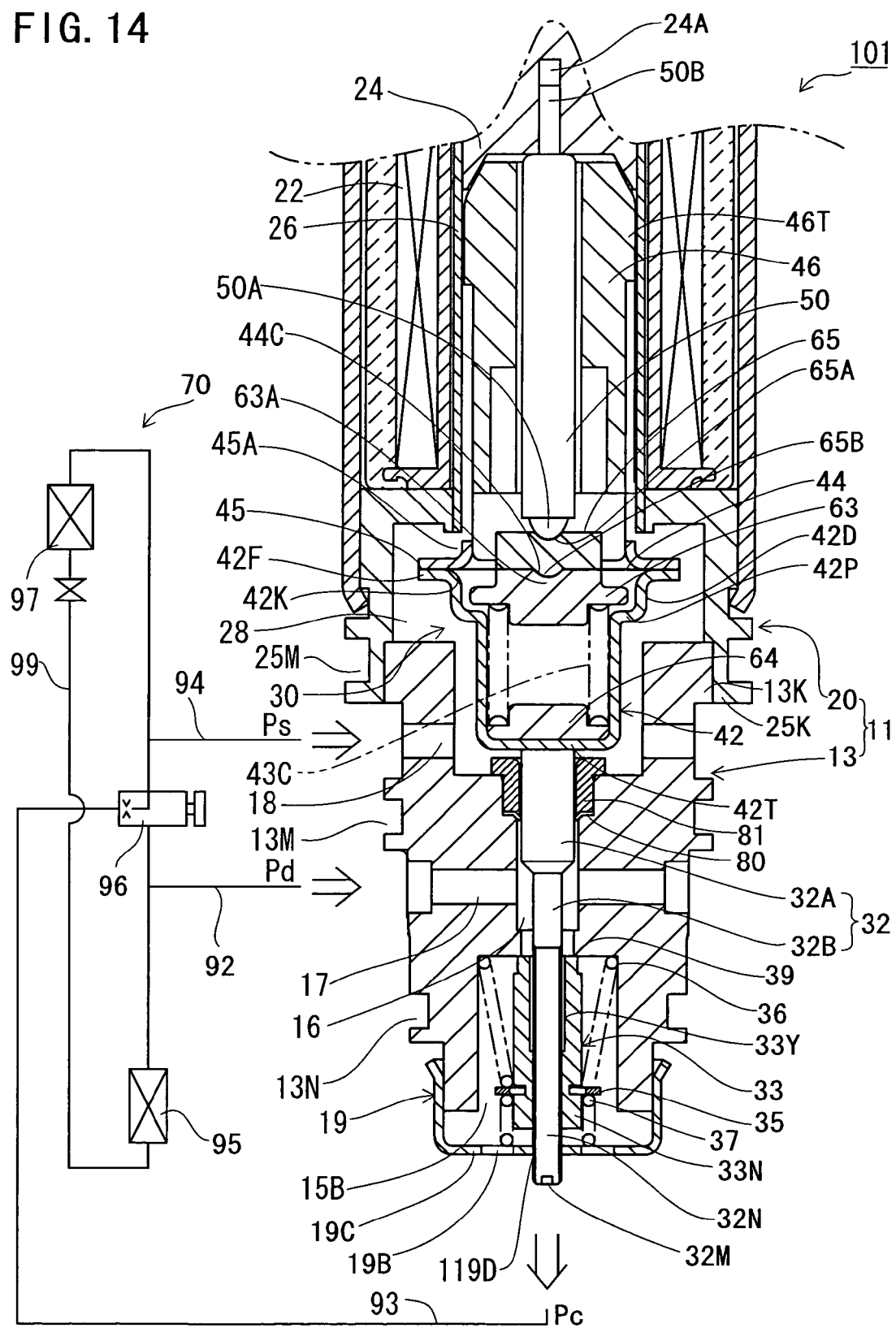
FIG. 14 is a longitudinally sectional side view of the pressure control valve in accordance with a fifth embodiment of the present invention.

FIG. 14 illustrates a fifth embodiment of the invention. The fifth embodiment differs from the fourth embodiment in that the outer adhering disc 65 is fixed to the central outer face of the diaphragm 44. Only the difference between the first and fifth embodiments will be described in detail later. Identical or similar parts in the fifth embodiment are labeled with the same reference symbols as those in the fourth embodiment, and the description of these parts will be eliminated.

In the pressure control valve 101 of the fifth embodiment, the outer adhering disc 65 is fixed to the central outer face of the diaphragm 44, for example, by an adhesive agent, whereby a central abutment in the invention is constructed. A semi-spherical centering depression 65A is formed in an upper face of the outer adhering disc 65. The centering protrusion 50A of the stretching member 50 is butted against the centering depression 65A. Furthermore, the diaphragm 44 is interposed between the outer and inner adhering discs 65 and 63. The outer adhering disc 65 has an underside provided with a convex engagement portion 65B which is brought into concavo-convex engagement with the semi-spherical depression 63A of the inner adhering disc 63. A semi-spherical expansion 44C is interposed between the semi-spherical depression 63A and the convex engagement portion 65B.

In the foregoing fifth embodiment, the outer adhering disc 65 is adhered to the outer face of the diaphragm 44 thereby to construct the central abutment. Accordingly, the diaphragm 44 can be reinforced. Furthermore, the semi-spherical concave depression 63A of the inner adhering disc 63 is in concavo-convex engagement with the convex engagement portion 65B of the outer adhering disc 65 with the diaphragm 44 being interposed therebetween. Consequently, the accuracy can be improved in the assembly of the outer adhering disc 65 and the diaphragm 44.

Several modified forms of the foregoing embodiments will now be described. In the pressure control valves 10, 90, 91, 100, 101 of the first to fifth embodiments, the depth of force-fitting of the fitting portions 13K and 25K may be changed so that the distance between the terminal wall 24 and the diaphragm 44 is adjusted.

In the first to third embodiments, the stretching member 50 is caused to come close to and depart away from the terminal wall 24. However, the stretching member 50 may be caused to come close to and depart away from the diaphragm 44 and may be integral with the terminal wall 24, instead.

In the first to third embodiments, the valve port 39 is closed when the diaphragm 44 is flat. However, the valve port 39 may be closed when the diaphragm 44 is expanded or depressed, instead.

In the fourth and fifth embodiments, the stretching member 50 is provided with the centering protrusion 50A and the diaphragm 44 side is provided with the centering depression 44B or 65A. However, the distal end of the stretching member may be depressed into a semi-spherical shape thereby to be formed into a centering depression and a tapered centering protrusion may protrude from the central portion of the diaphragm, instead.

In the fourth and fifth embodiments, the inner adhering disc 63 and/or outer adhering disc 65 may be adhered. However, the single diaphragm 44 may be abutted against the stretching member 50, instead.

In the first to fifth embodiments, stretching member 50 is assembled to the terminal wall 24 to be fixed. However, the stretching member may be formed integrally on the terminal wall, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A pressure control valve including a body to which a valve element is assembled so as to be movable and which is provided with a pressure detecting chamber, wherein the valve element opens a valve port when pressure of a fluid provided in the pressure detecting chamber is lower than a predetermined reference pressure, and the valve element closes the valve port when the fluid pressure in the pressure detecting chamber is higher than the predetermined reference pressure, the pressure control valve comprising:
   a shaft hole formed through a wall surrounding the pressure detecting chamber of the body, the shaft hole being provided with the valve port located at a side away from the pressure detecting chamber;
   a communication shaft inserted through the shaft hole and having an end protruding from the valve port and provided with the valve element;
   biasing means for biasing the valve element so that the valve element is pressed against an opening edge of the valve port thereby to close the valve port;
   a branch hole branched from a middle portion of the shaft hole and communicating with the valve port;
   a sealing member sealing a gap between the communication shaft and an inner wall of the shaft hole, said inner wall being located nearer to the pressure detecting chamber than the branch hole;
   a pressure sensing cylindrical member having a closed end fixed to the communication shaft in the pressure detecting chamber and an open end directed opposite the valve element;
   a diaphragm provided on the open end of the pressure sensing cylindrical member;
   a terminal wall provided on the body so as to be opposed to the diaphragm; and
   a stretching member stretched between the diaphragm and the terminal wall, the stretching member being subjected to a spring force the diaphragm receives when the fluid pressure in the pressure detecting chamber is lower than the predetermined reference pressure, thereby moving the valve element to the opening side.

2. A pressure control valve of claim 1, further comprising adjusting means for adjusting a distance between the terminal wall and the diaphragm when the valve port is closed by the valve element.

3. A pressure control valve of claim 2, wherein the valve element is cylindrical and includes a female thread provided in an inner wall thereof, the communication shaft includes a male thread provided on an outer wall thereof, and the female and male threads serve as the adjusting means and are brought into threading engagement with each other.

4. A pressure control valve of claim 2, wherein the pressure sensing cylindrical member and the communication shaft are discrete from each other and include female and male threads serving as the adjusting means brought into threading engagement with each other, respectively.

5. A pressure control valve of claim 2, further comprising a first communication shaft constituent constituting a part of the communication shaft and extending from the pressure sensing cylindrical member to a middle interior of the shaft hole, a second communication shaft constituent constituting another part of the communication shaft and formed integrally with the valve element so as to extend to a middle interior of the shaft hole, and male and female threads provided on the first and second communication shaft constituents and serving as the adjusting means brought into threading engagement with each other, respectively.

6. A pressure control valve of claim 2, wherein the body is divided and the adjusting means comprises a fitting portion force-fitted into a divided portion.

7. A pressure control valve of claim 1, further comprising a solenoid which is cylindrical and is fixed to the body, the solenoid serving as the biasing means, and a plunger which is cylindrical and has two open ends, the stretching member being inserted through the plunger, the plunger being fixed to the pressure sensing cylindrical member while one of the ends thereof is opposed to the diaphragm, the plunger being moved in subjection to a magnetic force of the solenoid.

8. A pressure control valve of claim 2, further comprising a solenoid which is cylindrical and is fixed to the body, the solenoid serving as the biasing means, and a plunger which is cylindrical and has two open ends, the stretching member being inserted through the plunger, the plunger being fixed to the pressure sensing cylindrical member while one of the ends thereof is opposed to the diaphragm, the plunger being moved in subjection to a magnetic force of the solenoid.

9. A pressure control valve of claim 6, further comprising a solenoid which is cylindrical and is fixed to the body, the solenoid serving as the biasing means, and a plunger which is cylindrical and has two open ends, the stretching member being inserted through the plunger, the plunger being fixed to the pressure sensing cylindrical member while one of the ends thereof is opposed to the diaphragm, the plunger being moved in subjection to a magnetic force of the solenoid.

10. A pressure control valve of claim 7, wherein the solenoid includes a connector standing from an end of the solenoid to supply electric power to the solenoid.

11. A pressure control valve of claim 7, wherein the body includes a proximal end guide provided therein for guiding the plunger in a direction of movement of the plunger and a distal end guide provided therein for guiding the communication shaft in the direction of movement of the plunger, the communication shaft having a distal end passed through the distal end guide.

12. A pressure control valve of claim 1, further comprising a built-in spring disposed in the pressure sensing cylindrical member so as to be compressed between a bottom of the pressure sensing cylindrical member and the diaphragm.

13. A pressure control valve of claim 1, wherein the shaft hole includes a larger-diameter portion formed by spreading an opening edge thereof at the pressure detecting chamber side, and the sealing member comprises a hollow, disc-shaped packing plate provided on an inner wall of the pressure detecting chamber, the pressure control valve further comprising a cylindrical bush fitted in the larger-diameter portion of the shaft hole to hold the packing plate between it and an inner wall of the larger-diameter portion of the shaft hole and a pressing protrusion protruding from a distal end inner edge of the bush to press an inner edge of the packing plate thereby to deform the inner edge of the packing plate into a funneled shape.

14. A pressure control valve of claim 2, wherein the shaft hole includes a larger-diameter portion formed by spreading an opening edge thereof at the pressure detecting chamber side, and the sealing member comprises a hollow, disc-shaped packing plate provided on an inner wall of the pressure detecting chamber, the pressure control valve further comprising a cylindrical bush fitted in the larger-diameter portion of the shaft hole to hold the packing plate between it and an inner wall of the larger-diameter portion of the shaft hole and a pressing protrusion protruding from a distal end inner edge of the bush to press an inner edge of the packing plate thereby to deform the inner edge of the packing plate into a funneled shape.

15. A pressure control valve of claim 6, wherein the shaft hole includes a larger-diameter portion formed by spreading an opening edge thereof at the pressure detecting chamber side, and the sealing member comprises a hollow, disc-shaped packing plate provided on an inner wall of the pressure detecting chamber, the pressure control valve further comprising a cylindrical bush fitted in the larger-diameter portion of the shaft hole to hold the packing plate between it and an inner wall of the larger-diameter portion of the shaft hole and a pressing protrusion protruding from a distal end inner edge of the bush to press an inner edge of the packing plate thereby to deform the inner edge of the packing plate into a funneled shape.

16. A pressure control valve of claim 7, wherein the shaft hole includes a larger-diameter portion formed by spreading an opening edge thereof at the pressure detecting chamber side, and the sealing member comprises a hollow, disc-shaped packing plate provided on an inner wall of the pressure detecting chamber, the pressure control valve further comprising a cylindrical bush fitted in the larger-diameter portion of the shaft hole to hold the packing plate between it and an inner wall of the larger-diameter portion of the shaft hole and a pressing protrusion protruding from a distal end inner edge of the bush to press an inner edge of the packing plate thereby to deform the inner edge of the packing plate into a funneled shape.

17. A pressure control valve of claim 11, wherein the shaft hole includes a larger-diameter portion formed by spreading an opening edge thereof at the pressure detecting chamber side, and the sealing member comprises a hollow, disc-shaped packing plate provided on an inner wall of the pressure detecting chamber, the pressure control valve further comprising a cylindrical bush fitted in the larger-diameter portion of the shaft hole to hold the packing plate between it and an inner wall of the larger-diameter portion of the shaft hole and a pressing protrusion protruding from a distal end inner edge of the bush to press an inner edge of the packing plate thereby to deform the inner edge of the packing plate into a funneled shape.

18. A pressure control valve of claim 1, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member corresponds with a center of the diaphragm.

19. A pressure control valve of claim 2, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member corresponds with a center of the diaphragm.

20. A pressure control valve of claim 6, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member is aligned with a center of the diaphragm.

21. A pressure control valve of claim 7, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member is aligned with a center of the diaphragm.

22. A pressure control valve of claim 11, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member is aligned with a center of the diaphragm.

23. A pressure control valve of claim 13, wherein the diaphragm includes a circular rib formed thereon and a central abutment portion provided on a central portion of the rib so that the stretching member is abutted against the abutment portion, the pressure control valve further comprising a tapered centering protrusion formed on one of the stretching member and the central abutment portion and a centering depression formed in the other of the stretching member and the central abutment portion and receiving and guiding the centering protrusion so that a central axis of the stretching member is aligned with a center of the diaphragm.

24. A pressure control valve of claim 18, wherein the centering protrusion has an outer face and the centering depression has an inner face and the outer face of the centering protrusion and/or the inner face of the centering depression is formed with a substantially spherical face.

25. A pressure control valve of claim 18, further comprising an inner adhering disc adhering to the inner face of the diaphragm and constituting the central abutment portion together with the diaphragm, the inner adhering disc further including a portion adherent to the diaphragm and including a part thereof depressed together with the diaphragm, said part constituting the centering depression.

26. A pressure control valve of claim 18, further comprising an outer adhering disc adhering to the outer face of the diaphragm and constituting the central abutment portion together with the diaphragm, the outer adhering disc having the centering depression opposed to the face thereof adherent to the diaphragm.

27. A pressure control valve of claim 26, further comprising an inner adhering disc adhering to the inner face of the pressure sensing cylindrical member while the diaphragm is held between the outer and inner adhering discs, the pressure control valve still further comprising concavo-convex engagement portions provided in the inner and outer adhering discs engaging each other in a concavo-convex manner with the diaphragm being interposed therebetween.

28. A pressure control valve of claim 18, wherein the terminal wall has a fixing hole in which a proximal end of the stretching member is fitted thereby to be fixed.

* * * * *